Nov. 3, 1925.　　　　　　　　　　　　　　　　　　　1,560,351
A. SEIDEL
FRAME OF POWER DRIVEN VEHICLES
Filed Dec. 16, 1924　　　3 Sheets-Sheet 1

Inventor
A. Seidel
By Marko Clerk
Attys.

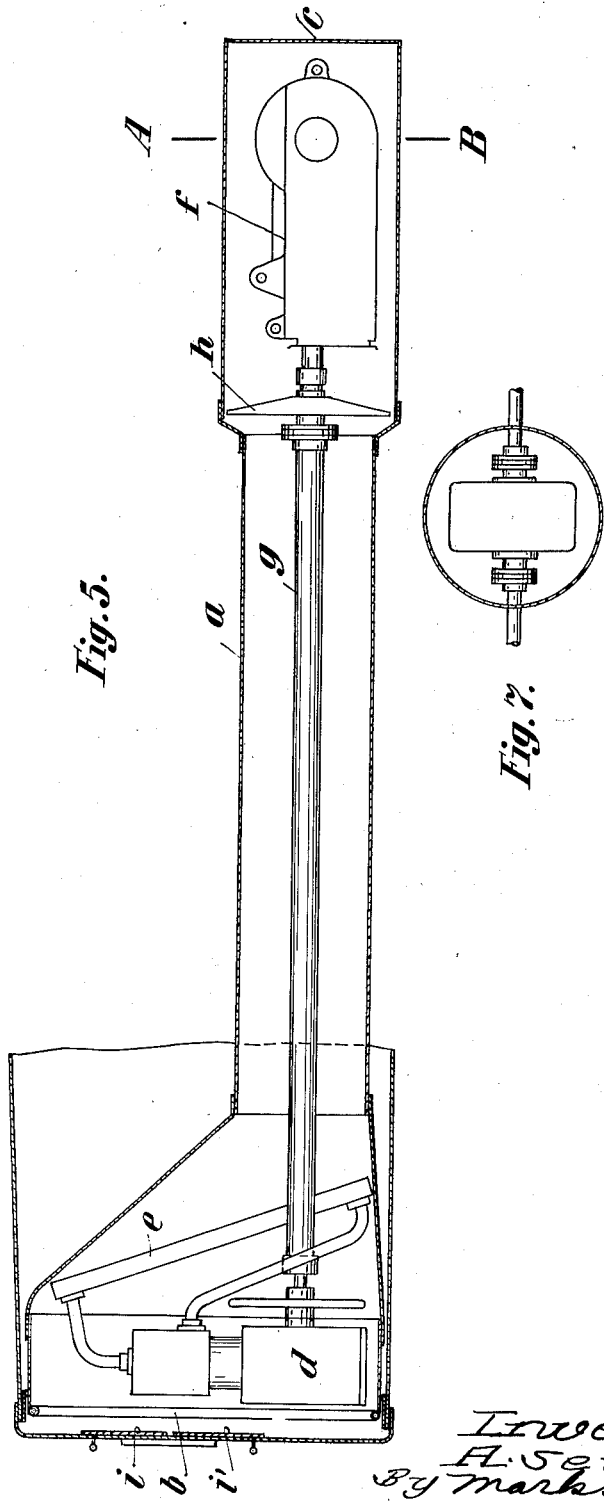

Nov. 3, 1925. 1,560,351
A. SEIDEL
FRAME OF POWER DRIVEN VEHICLES
Filed Dec. 16, 1924  3 Sheets-Sheet 3
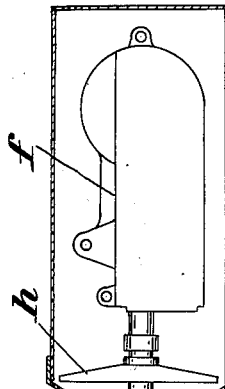
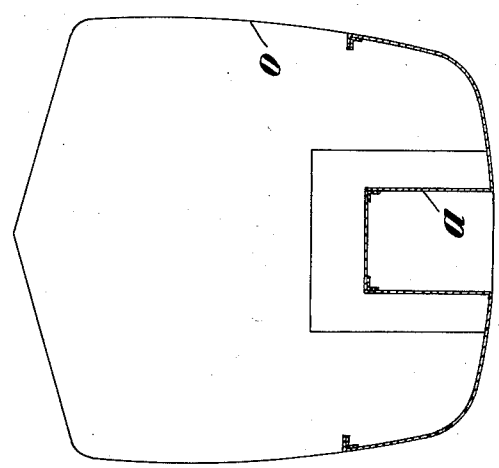
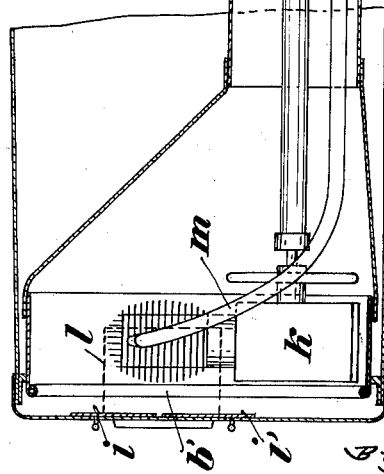

Patented Nov. 3, 1925.

1,560,351

UNITED STATES PATENT OFFICE.

ARNOLD SEIDEL, OF BERLIN-CHARLOTTENBURG, GERMANY.

FRAME OF POWER-DRIVEN VEHICLES.

Application filed December 16, 1924. Serial No. 756,305.

*To all whom it may concern:*

Be it known that I, ARNOLD SEIDEL, a citizen of Germany, residing at Berlin-Charlottenburg, Germany, Bismarckstrasse 10, have invented certain new and useful Improvements in the Frames of Power-Driven Vehicles, of which the following is a specification.

In power driven vehicles of a known type having a frame consisting of a hollow girder, the body of the vehicle is placed onto or laterally of the hollow girder. This construction was necessitated by the mounting of the motor and the transmission members, which extend at least partially beyond the circumference of the hollow girder.

According to the present invention the arrangement is such that the hollow girder, which forms the vehicle frame and totally encloses the motor and the transmission members, passes longitudinally through the body of the vehicle. This arrangement simplifies the construction of the vehicle, as it enables the body of the vehicle to be slipped onto the under-frame.

The hollow girder can also be utilized for the passage of cooling air for the motor produced by a fan. For this purpose inlet openings for the air are provided at the forward end of the girder in the casing of the vehicle and on the transmission shaft between the engine, which lies at the front and is provided with coolers or cooling ribs, and the gearing at the back for driving the shaft fan blades are provided, which induce a current of air through the hollow girder. This arrangement has the advantage, that power-consuming air eddies are prevented and that dust and bad odours are eliminated and also complicated means for driving the fan. An additional advantage is, that the vehicle may be heated by the gases heated by the motor without the provision of separate devices for this purpose, this heating being capable of regulation by the air apertures.

Several constructional examples of the invention are shown diagrammatically in the accompanying drawing.

Fig. 1 being a longitudinal section through a power driven vehicle according to the invention, Fig. 2 a plan view of Fig. 1, Fig. 3 a rear elevation of the vehicle.

Figs. 5 and 6 show the arrangement of the engine and the gearing in the hollow girder and Fig. 7 is a cross-section on line A—B of Fig. 5.

Fig. 8 is a cross-section through the body of the vehicle with a rectangular hollow girder.

Figure 1:
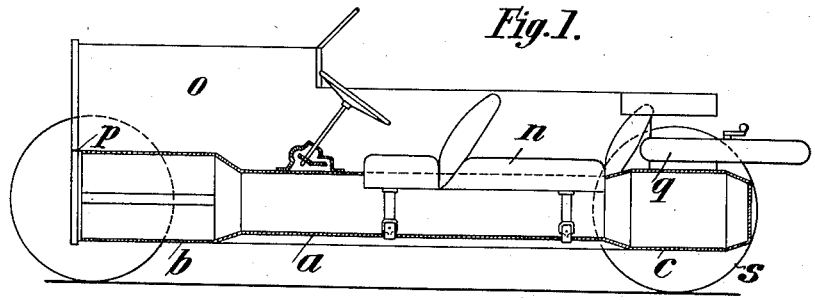
Figure 2:
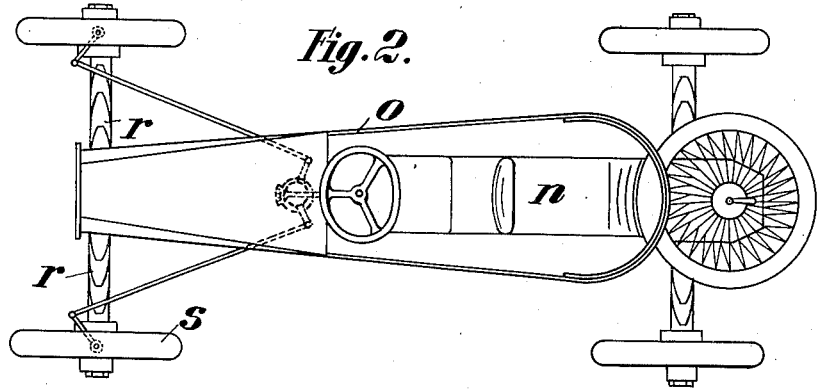
Figure 3:
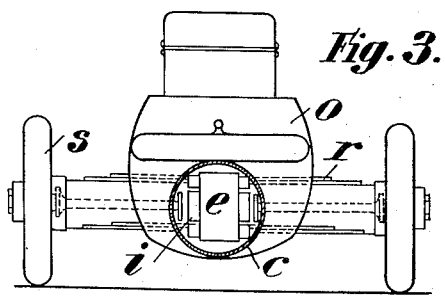

In the constructional form shown in Figs. 1–3 the hollow girder $a$ consists of a tube, which has an enlarged part $b$ at the front and an enlarged part $c$ at the back. The tube may be composed of two parts, which are welded together along the longitudinal seam (a neutral plane in the direction in which the vehicle travels) or can be made of a single rolled piece of sheet metal having only one seam. The front and rear enlarged portions of the tube provide spaces for the housing of the motor and the entire driving gear $e$ within the tube.

The seats $n$ are mounted directly on the hollow girder $a$ and the foot-boards for climbing into the vehicle may also be fixed to the hollow girder. The body $o$ of the vehicle is slid over the hollow girder $a$, in the form of a closed sheet metal case and is supported only at the front at $p$ and at the back at $q$ on the hollow girder. After the body of the vehicle has been slid onto the tube, the front and rear transverse springs $r$ carrying the wheels $s$ of the vehicle are attached to the hollow girder $a$.

Figure 4:
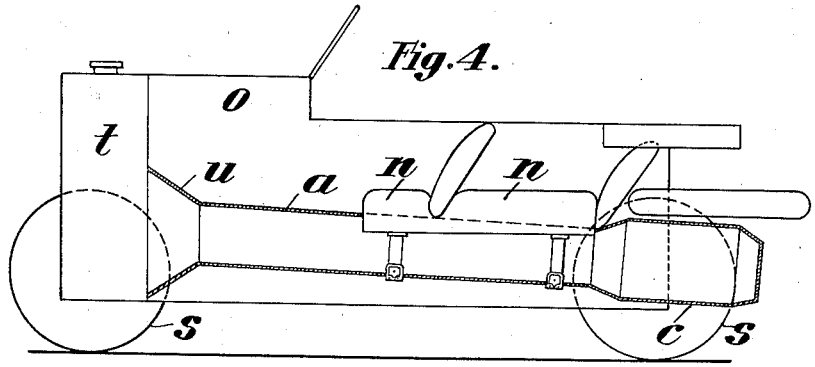
Fig. 4 is a longitudinal section through another constructional form of the invention.

In place of the forward round extension $b$ of the tube $a$, a casing $t$ of any shape and of any dimensions may be used for housing and mounting the engine, as shown in Fig. 4, which casing may contain besides the engine the petrol and air tank, the electric head lights, the accumulator battery with the dynamo and the requisite tools for the engine and the like.

The rear wall of the casing, which corresponds approximately in its dimensions to the usual cooling device of a power driven vehicle and forms a tight closure for the engine, preferably also acts as the dash-board or wind-screen for the occupants of the car. It is preferably connected to the tube $a$ by a tubular extension $u$ on the rear side of the casing. This tubular extension preferably tapers from the casing $t$ to the tube $a$ from the diameter of the fan to the diameter of the tube.

Figs. 5 and 7 show how the hollow girder $a$ may be utilized for housing the motor $d$ and the gear box $f$. The engine shown in Fig. 5 has a water cooler $e$. The forward extension $b$ of the tube is covered and provided with apertures, which, for regulating the admission of air are covered by adjustable slides $i$ and $i'$. The fan $h$, for drawing the air through the hollow girder $a$, is mounted directly on the transmission shaft $g$ between the motor and the gear box.

Fig. 6 shows an air cooled engine $k$ and an air guiding funnel $l$, which starts from the air inlet opening $b'$ half surrounding the cylinder head and the cooling ribs of the engine. The exhaust pipe $m$ of the engine $k$ is placed inside the hollow girder, so that the air passing through the girder may carry away the exhaust gases. The movement of the air is in this case again caused by the fan $h$ mounted directly on the transmission shaft $g$.

In the constructional form shown in Fig. 8 the hollow girder $a$ is rectangular. It extends along the bottom wall of the body of the vehicle.

What I claim is:—

1. In a motor vehicle the combination with a body, of a hollow support extending through the body for the reception of the entire drive of the vehicle including the motor, the transmission elements and the rear axle drive, a fan connected to the drive and arranged within the casing, and an adjustable air admission means at the forward end of the support, substantially as and for the purposes set forth.

2. In a motor vehicle including in combination a body, a hollow support extending through the body for the reception of the entire drive including the motor, the transmission elements, the rear axle drive as well as the exhaust manifold, a fan connected to the drive and arranged within the support, the forward end of the support being constructed in funnel shaped formation with the extreme forward end closed and provided with air inlet openings, and means for regulating the amount of air admitted through the openings.

In testimony whereof I have affixed my signature.

ARNOLD SEIDEL.